United States Patent [19]

Rappold et al.

[11] Patent Number: 5,124,365

[45] Date of Patent: Jun. 23, 1992

[54] FINELY DIVIDED, EXPANDABLE STYRENE POLYMERS

[75] Inventors: Kurt Rappold, Heidelberg; Horst Steinbrecher, Roemerberg; Manfred Walter, Speyer, all of Fed. Rep. of Germany

[73] Assignee: BASF Aktiengesellschaft, Ludwigshafen, Fed. Rep. of Germany

[21] Appl. No.: 676,362

[22] Filed: Mar. 28, 1991

[30] Foreign Application Priority Data

Mar. 28, 1990 [DE] Fed. Rep. of Germany ....... 4009897

[51] Int. Cl.⁵ .......................... C08J 9/232; C08J 9/236
[52] U.S. Cl. ...................................... 521/57; 427/222; 428/407; 521/55; 521/91
[58] Field of Search ................... 521/57, 55; 427/222; 428/407

[56] References Cited

U.S. PATENT DOCUMENTS

| | | | |
|---|---|---|---|
| 2,861,898 | 11/1958 | Platzer | 521/57 |
| 3,304,274 | 2/1967 | Eng | 521/57 |
| 3,661,810 | 5/1972 | Gahmig | 521/57 |
| 4,198,485 | 4/1980 | Stark, Jr. | 521/57 |
| 4,446,208 | 5/1984 | Schwarz | 521/57 |
| 4,448,900 | 5/1984 | Schwarz | 521/57 |

*Primary Examiner*—Morton Foelak
*Attorney, Agent, or Firm*—Oblon, Spivak, McClelland, Maier & Neustadt

[57] ABSTRACT

Expandable styrene polymers having a particle diameter of from 0.025 to 0.3 mm and coated with 0.5% by weight or more of a finely divided solid having a melting point above 120° C. are used as a heat-insulating filler for lightweight plaster.

5 Claims, No Drawings

FINELY DIVIDED, EXPANDABLE STYRENE POLYMERS

The present invention relates to extremely finely divided, expandable styrene polymers, to foam particles produced therefrom, and to the use thereof as a filler for lightweight plaster.

The industrial scale preparation of expandable styrene polymers (EPS) by suspension polymerization also gives small amounts of extremely finely divided EPS particles, which have hitherto not been employed in industry since they stick to one another to a considerable extent during expansion. They are unsuitable for the production of foam moldings. These fractions have therefore hitherto been discarded, burnt or, after dissolution in styrene, subjected to further suspension polymerization. However, recycling of this type results in impaired EPS quality. It is an object of the present invention to find an economical use for these finely divided EPS marginal fractions.

Finely divided EPS screen fractions having a bead size of from 0.3 mm to 0.7 mm have been used, after expansion, as a filler for lightweight plaster. The size of the foam beads means that the surface of the finished plaster layer is quite rough. It is a further object of the present invention to find a heat-insulating aggregate for lightweight plaster which allows smooth plaster surfaces to be produced.

We have found that, surprisingly, these objects are achieved by EPS fractions which have a particle size of from 0.025 to 0.3 mm and are coated with 0.5% by weight or more of a finely divided, water-insoluble solid which does not melt under the further-processing conditions. These particles do not stick to one another during expansion. The foam particles produced therefrom can be used as a filler for lightweight plaster which allows smooth plaster surfaces to be produced.

The invention accordingly provides an expandable styrene polymer having a particle diameter of from 0.025 to 0.3 mm and containing
(a) a styrene polymer,
(b) from 2 to 10% by weight, based on (a), of a $C_3$- to $C_6$-hydrocarbon as blowing agent,
(c) 0.5% by weight or more, based on (a), of a coating comprising a water-insoluble solid having a melting point above 120° C. and having a mean particle diameter of from 0.1 to 15 $\mu$m, and, if desired,
(d) conventional additives in effective amounts.

The present invention furthermore provides a process for the preparation of an expandable styrene polymer of this type, which comprises isolating a further fraction of polymer particles having a particle size of from 0.025 to 0.3 mm by centrifugation from the effluent from the conventional preparation of an expandable styrene polymer by suspension polymerization of styrene in the presence of a blowing agent, with separation of the polymer particles having a size of from 0.3 mm or larger, washing and drying these particles and coating them with component (c).

The present invention moreover provides styrene polymer foam particles having a bulk density of from 15 to 40 kg/m³, having a particle diameter of from 0.05 to 1.2 mm and containing 0.5% by weight or more, based on the polymer, of a coating comprising a water-insoluble solid having a melting point above 120° C. and having a mean particle diameter of from 0.1 to 15 $\mu$m, and, if desired, conventional additives in effective amounts, and to a method of using these styrene polymer foam particles as a heat-insulating filler for lightweight plaster.

The expandable styrene polymer according to the invention has a particle diameter of from 0.025 to 0.3 mm, preferably from 0.05 to 0.25 mm, in particular from 0.06 to 0.2 mm.

For the purposes of the present invention, styrene polymers are polystyrene and copolymers of styrene with other $\alpha,\beta$-olefinically unsaturated compounds which contain 50 parts by weight or more of styrene in copolymerized form. Examples of suitable comonomers are $\alpha$-methylstyrene, ring-halogenated styrenes, ring-alkylated styrenes, acrylonitrile, esters of acrylic or methacrylic acid with alcohols having from 1 to 8 carbon atoms, N-vinyl compounds, such as vinylcarbazole, maleic anhydride or small amounts of compounds which contain two polymerizable double bonds, such as butadiene, divinylbenzene or butanediol diacrylate.

The particles contain, as blowing agent, from 1 to 10% by weight, preferably from 3 to 8% by weight, of a $C_3$- to $C_6$-hydrocarbon, such as propane, butane, isobutane, n-pentane, i-pentane, neopentane and/or hexane. A commercially available pentane mixture is preferred.

The styrene polymers may also contain conventional amounts of other substances which give the expandable products certain properties. Specific examples are flameproofing agents based on organic bromine or chlorine compounds, which may also be in the form of microcapsules with a styrene-insoluble coating, such as trisdibromopropyl phosphate, hexabromocyclododecane, chlorinated paraffin, and synergists for flameproofing agents, such as dicumyl peroxide and highly unstable organic peroxides; furthermore antistatics, stabilizers, dyes, lubricants and fillers.

It is essential to the invention that the particles are coated with a water-insoluble, finely divided solid, which has the task of preventing the particles sticking to one another during expansion. The solid should neither soften nor melt under the further-processing conditions, i.e. should have a melting point above 120° C, preferably above 150° C. In addition, it should be extremely finely divided, i.e. should have a mean particle size of from 0.1 to 15 $\mu$m, preferably from 0.5 to 10 $\mu$m.

The coating should make up 0.5% by weight or more, preferably 0.8% by weight or more, in particular from 1 to 2% by weight, based on the styrene polymer. Solids which are hydrophobic or have been rendered hydrophobic are particularly suitable.

Suitable solids are water-insoluble carbonates, carboxylic acid salts, oxides and mixed oxides of metals from group II, III and/or IV of the periodic table, such as calcium carbonate, magnesium carbonate, barium carbonate, zinc carbonate, magnesium stearate, calcium palmitate, zinc stearate, aluminum stearate, zinc oxide, aluminum oxide, titanium dioxide, silicon dioxide, magnesium silicate, calcium silicate and aluminum silicate.

The preferred hydrophobing agents are silicones.

The finely divided, expandable styrene polymer used is advantageously the finely divided waste product from EPS production, as produced in an amount of from about 1 to 5% by weight on conventional polymerization of styrene in aqueous suspension in the presence of a blowing agent and in the presence of a suspension assistant. After the majority of the EPS has been separated off using a centrifugal filter having a mesh width of from about 0.2 to 0.3 mm, preferably 0.25 mm, a further fraction of EPS particles having a particle size of from about 0.025 to 0.3 mm is isolated from the effluent by centrifugation, for example by means of a decanter, washed and subsequently dried. The coating can be applied in a conventional tumble mixer.

The EPS particles according to the invention can be expanded to give foam particles by heating using hot air or in particular using steam. These particles have a density of from 10 to 65 kg/m$^3$ (bulk density from about 15 to 40 kg/m$^3$). The particle diameter is from about 0.05 to 1.2 mm, preferably from 0.1 to 1.0 mm.

The coating effectively prevents the particles sticking to one another during foaming.

The foam particles according to the invention are used as a heat-insulating filler for lightweight plaster.

The lightweight plaster contains from about 20 to 80% by volume, preferably from 30 to 50% by volume, of the foam particles, but otherwise has a conventional mineral basis, such as gypsum, lime or cement and conventional mineral aggregates.

EXAMPLE 1

Isolation of EPS having a particle size of from 0.03 to 0.25 mm

EPS particles having a particle size of from 0.03 to 0.25 mm are separated off by means of a decanter from the effluent from EPS production, as produced after the majority of the EPS (blowing agent content 7% by weight of pentane) has been separated off using a centrifugal filter having a mesh width of 0.25 mm and after the product has been washed. The finely divided product is washed with a 10-fold amount of water, the adhering water is spun off in a dry decanter, and the product is subsequently dried in a hot-air drier. The pentane content of the product is 6% by weight.

EXAMPLE 2

EPS coating and production of the foam particles

The EPS particles obtained in Example 1 are coated in a tumble mixer with the amount of a solid indicated in the Table, and subsequently expanded for about 90 seconds at 115° C. in a pressure prefoamer having a sealed base plate with a steam inlet at the side. Foam particles which have stuck together are subsequently separated through a screen (degree of adhesion). The results obtained are given in the Table.

EXAMPLE 3

Plaster compositions and properties 3.1. 500 parts by volume of foam particles from Examples 2.2, 2.3 and 2.5 to 2.9 are mixed with 1000 parts by volume of industrial gypsum. After mixing to a paste using water, the material is used to produce heat-insulating internal plaster coatings which have a particularly smooth surface.

3.2. 350 parts by volume of foam particles from Examples 2.2, 2.3 and 2.5 to 2.9 are mixed with 1000 parts by volume of a commercially available mineral external plaster. After mixing to a paste with water, the material is used to produce heat-insulating external plaster coatings which have a particularly smooth surface.

TABLE

| Example | Coating material | Amount [% by weight] | Mean particle size [μm] | Bulk density [g/l] | Degree of adhesion % |
| --- | --- | --- | --- | --- | --- |
| 2.1 (Comparison) | hydrophobicized SiO$_2$ (Sipernat D17 from Degussa) | 0.4 | 10 | 18.0 | 16 |
| 2.2 | hydrophobicized SiO$_2$ | 0.8 | 10 | 19.3 | 3.2 |
| 2.3 | hydrophobicized SiO$_2$ | 1.0 | 10 | 19.8 | 0.8 |
| 2.4 (Comparison) | non-hydrophobicized SiO$_2$ (Aerosil 200 from Degussa) | 0.4 | 12 | 18.5 | 25 |
| 2.5 | non-hydrophobicized SiO$_2$ | 1.0 | 12 | 19.1 | 6 |
| 2.6 | magnesium stearate | 2 | 14 | 22 | 8 |
| 2.7 | TiO$_2$ | 2 | 14 | 21 | 9 |
| 2.8 | calcium carbonate | 1.5 | 15 | 20 | 7 |
| 2.9 | Al$_2$O$_3$ | 1.8 | 15 | 22 | 8 |

We claim:

1. A lightweight plaster based on mineral binders and containing from 20 to 80% by volume of styrene polymer foam particles having a bulk density of from 15 to 40 kg/cm$^3$, said particles having a particle diameter of from 0.05 to 1.2 mm and containing 0.5% by weight or more, based on the polymer, of a coating comprising a water-insoluble solid having a melting point above 120° C. and having a mean particle diameter of from 0.1 to 15 μm, and, optionally conventional additives in effective amounts.

2. A lightweight plaster as claimed in claim 1 wherein said styrene polymer foam particles are produced by expanding an expandable styrene polymer having a particle diameter of from 0.025 to 0.3 mm and containing
   (a) a styrene polymer,
   (b) from 2 to 10% by weight, based on (a), of a C$_3$- to C$_6$-hydrocarbon as blowing agent,
   (c) 0.5% by weight or more, based on (a), of a coating comprising a water-insoluble solid having a melting point above 120° C. and having a mean particle diameter of from 0.1 to 15 μm, and, optionally
   (d) conventional additives in effective amounts.

3. A lightweight plaster as claimed in claim 1 wherein said expandable styrene polymer contains as component (c), a carbonate, carboxylic acid salt, oxide or mixed oxide of a metal from group II, III and/or IV of the Periodic Table.

4. A lightweight plaster as claimed in claims 1 or 2 wherein said component (c) of said expandable styrene polymer is hydrophobic or has been rendered hydrophobic.

5. A method of preparing lightweight plaster comprising adding the styrene polymer foam particles of claims 1, 2, or 3 as a heat-insulating filler to plaster.

* * * * *